(12) United States Patent
Leyva et al.

(10) Patent No.: US 6,434,287 B1
(45) Date of Patent: Aug. 13, 2002

(54) LOW LOSS WAVELENGTH SELECTIVE OPTICAL SWITCH

(75) Inventors: Victor Leyva, Pasadena; Xian-Li Yeh, Walnut, both of CA (US)

(73) Assignee: Arroyo Optics, Inc., Santa Monica, CA (US)

( * ) Notice: Subject to any disclaimer, the term of this patent is extended or adjusted under 35 U.S.C. 154(b) by 0 days.

(21) Appl. No.: 09/518,216

(22) Filed: Mar. 3, 2000

(51) Int. Cl.[7] .............................. G02B 6/26; G02B 6/34
(52) U.S. Cl. .............................. 385/16; 385/37; 385/45
(58) Field of Search ..................... 385/16, 37, 40–43, 385/24, 45, 136, 137

(56) References Cited

U.S. PATENT DOCUMENTS

| | | | |
|---|---|---|---|
| 5,457,758 A | 10/1995 | Snitzer | 385/36 |
| 5,875,272 A | * 2/1999 | Kewitsch et al. | 385/37 |
| 6,154,590 A | * 11/2000 | Jin et al. | 385/37 |
| 6,169,831 B1 | * 1/2001 | Adams et al. | 385/37 |
| 6,181,851 B1 | * 1/2001 | Pan et al. | 385/37 |
| 6,187,700 B1 | * 2/2001 | Merkel | 501/102 |
| 6,327,405 B1 | * 12/2001 | Leyva et al. | 385/12 |

* cited by examiner

*Primary Examiner*—Hemang Sanghavi
*Assistant Examiner*—Omar Rojas, Jr.
(74) *Attorney, Agent, or Firm*—Jones, Tullar & Cooper, P.C.

(57) ABSTRACT

A fast acting, low insertion loss switch for use in an optical fiber communication system includes a small diameter waist region incorporating a Bragg grating which is precisely tuned by tensioning to be reflective at a selective wavelength band. By a small physical shift of the waist, as by lateral displacement of an attached small magnetic element with a magnetic field, the periodicity of the grating is varied so that the selected wavelength is passed through the waist with virtually no loss. The incremental motion required can be introduced by a variety of devices, selected in accordance with cost, size and response time requirements. Modules having a number of such switches in close juxtaposition offer distinct advantages for wavelength division multiplexed systems.

16 Claims, 7 Drawing Sheets

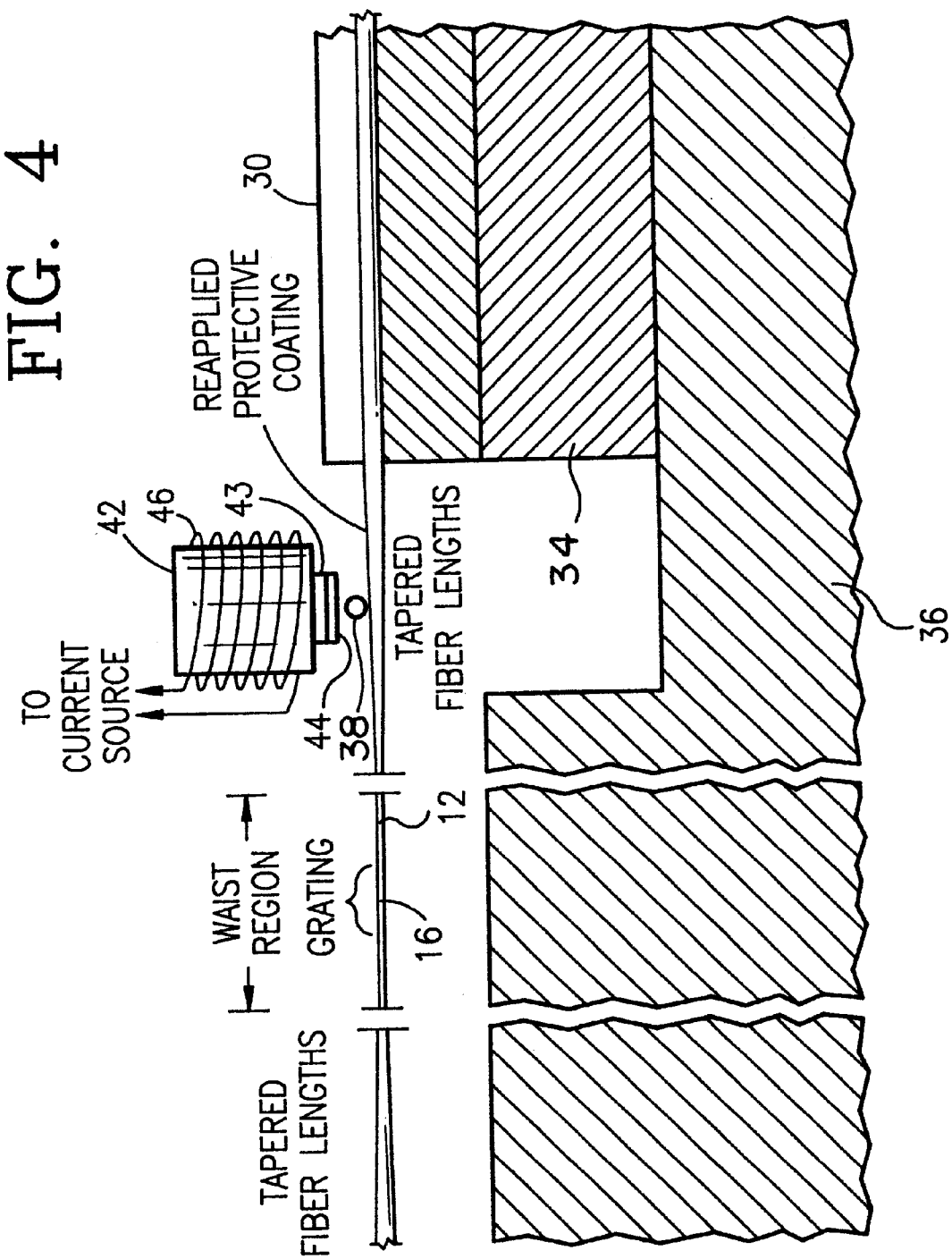

LOW LOSS WAVELENGTH SELECTIVE OPTICAL SWITCH

FIELD OF THE INVENTION

This invention relates to optical waveguide systems and devices, and more particularly to systems and devices which are intended to switch signals of selected optical wavelengths from one waveguide to another.

BACKGROUND OF THE INVENTION

Systems for communicating or processing data at optical wavelengths are in wide use, and the number of applications for such systems are increasing rapidly. A basic component for such systems is the optical switch, for transferring an input signal to either of two lines (such as optical waveguide fibers). There are a number of corollaries of electromechanical switches that are known, operating on the principle of displacing a conductive element so that it completes an optical circuit with one line or another. However, even though much work has been done on improving alignment and matching techniques, the transition of a signal from one element to another inevitably introduces losses. The techniques for reducing those losses introduce undesirable and sometimes unacceptable increments of cost.

Furthermore, modern communication and other systems take advantage wherever economically feasible of the broadband capabilities of optical waveguides, as by the use of wavelength division multiplexing to propagate a number of wavelength separated signals on one optical fiber. In the standards that have evolved for wavelength division multiplexing (WDM) and dense wavelength division multiplexing (DWDM), there are specific, closely spaced channels at designated wavelengths. Wavelength sensitive devices, such as add/drop filters and couplers, are utilized to extract signals in specific channels from, or add signals in specific channels to, the multiplexed signal. In some modern systems, therefore, switching a specific wavelength out of a WDM line requires both a wavelength selective coupler and a conventional switch. The added elements are not only more costly, but the losses introduced where matching or transitions are needed become unacceptable, particularly if a number of switches are to be used in the system. There is therefore a need for a wavelength selective optical switching system that has negligible loss and can provide a high degree of selectivity for a specific channel.

SUMMARY OF THE INVENTION

Devices and systems in accordance with the invention employ a grating assisted optical coupler having a length of small diameter (e.g. less than 15 microns) fiber that includes a Bragg grating that is reflective at wavelengths of a given periodicity. This length of fiber is held under precise tension, to tune the. periodicity of the refractive index variations to the specific wavelength desired. Under these circumstances, input signals at the selected wavelength are reflected back to a drop port, until the periodicity of the grating is varied. In the present example this is done on demand by stretching the small diameter section a small amount, shifting the effective wavelength to outside the band of the target channel. Thus the signal passes through the grating region to a different output fiber instead of being reflected. In either event, fiber continuity is not affected and losses are very low. By this arrangement, the small diameter section containing the grating is stretched only within its elasticity limits, and only by a small movement, which is imparted very rapidly, achieving desired switch response times.

In a more specific example of a wavelength selective optical switch, the unit comprises an add/drop coupler having an input port and drop port on one side of a waist region of small diameter containing the Bragg grating, and also having throughput port and add port terminals on the opposite side of the Bragg grating region. The waist region is held under controlled tension in a temperature compensated structure, and also tuned by tension to selected grating periodicity. This grating assisted coupler includes biconical tapered sections leading from each of the ports to the waist region, at which two greatly reduced diameter fiber elements are fused together. To stretch this reduced diameter waist region rapidly in controlled fashion, a small ferromagnetic element is attached to a tapered section at a distance from the Bragg grating. The ferromagnetic metal element and the fiber are deflected toward an associated electromagnet having a pole tip of the order of 1 mm away, stretching the Bragg region. This is realized within a switching time of less than 10 milliseconds. Thus selected wavelength signals that normally would be reflected back from the Bragg grating region to the drop port are transferred through the waist region to the output port. This coupler further offers the advantage of enabling addition of a signal of the selected wavelength at the add port, even though a multiplexed signal at the same wavelength is concurrently being dropped. Further mechanical stability and switch life are enhanced by incorporating a buffer element between the electromagnetic pole tip and the metal on the tapered fiber section which is deflected during switching.

Other aspects of this combination reside in the fact that the mounting structure which holds the ends of the span containing the Bragg grating compensates for temperature variations that would otherwise affect wavelength sensitivity. The change in periodicity, when the switch is activated, does not affect passband characteristics, so that there is no waste of spectrum or interference.

Only a small deviation in length is needed to change the reflection characteristic of the Bragg grating, and so a number of other expedients can be employed to effect switching in accordance with the invention. For example, a small deflection movement can be introduced even more rapidly by employing a leverage arm whose free end shifts the waist region laterally with a small angle movement of a rotary actuator at the opposite end. Other actuating forces may alternatively be generated using electronic, electromagnetic or electrostatic effects. Extremely high rate movements through limited distances are possible with capacitive devices, cantilevered elements, Hall effect devices and piezoelectric devices, for example. Furthermore, a small voice coil mechanism might alternatively be used to provide higher speed movement and faster switching.

Methods in accordance with the invention include the steps of establishing a narrow band of wavelength selectivity, using tension to maintain the selectivity and then varying the responsiveness by mechanically stretching until the periodicity has been shifted outside the selected wavelength band. Further, the methods employ tuning and temperature stabilization to enhance the precision and long life properties of the device.

BRIEF DESCRIPTION OF THE DRAWINGS

A better understanding of the invention may be had by reference to the following description, taken in conjunction with the accompanying drawings, in which:

FIG. 4 is an enlarged side view of the device of FIGS. 1 to 3, showing the relationship of different parts of the waveguides incorporating the switch, but exaggerated in size for clarity;

DETAILED DESCRIPTION

Figure 1:
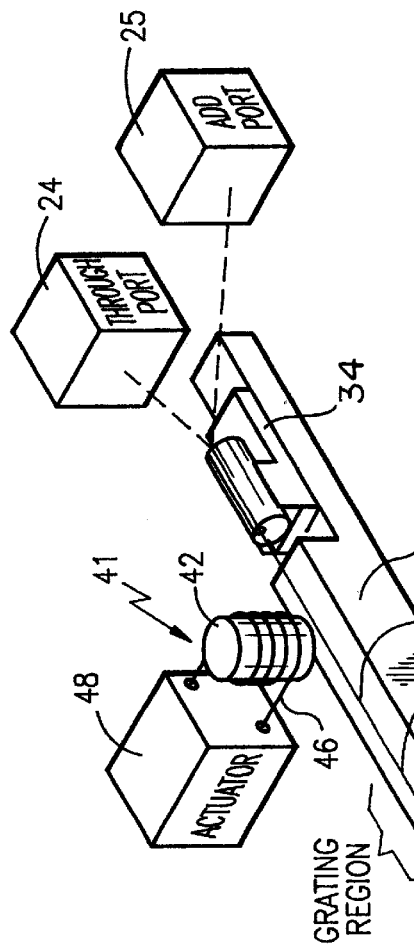
FIG. 1 is a perspective view, partially broken away, of a switch for optical waveguide systems.
Figure 2:
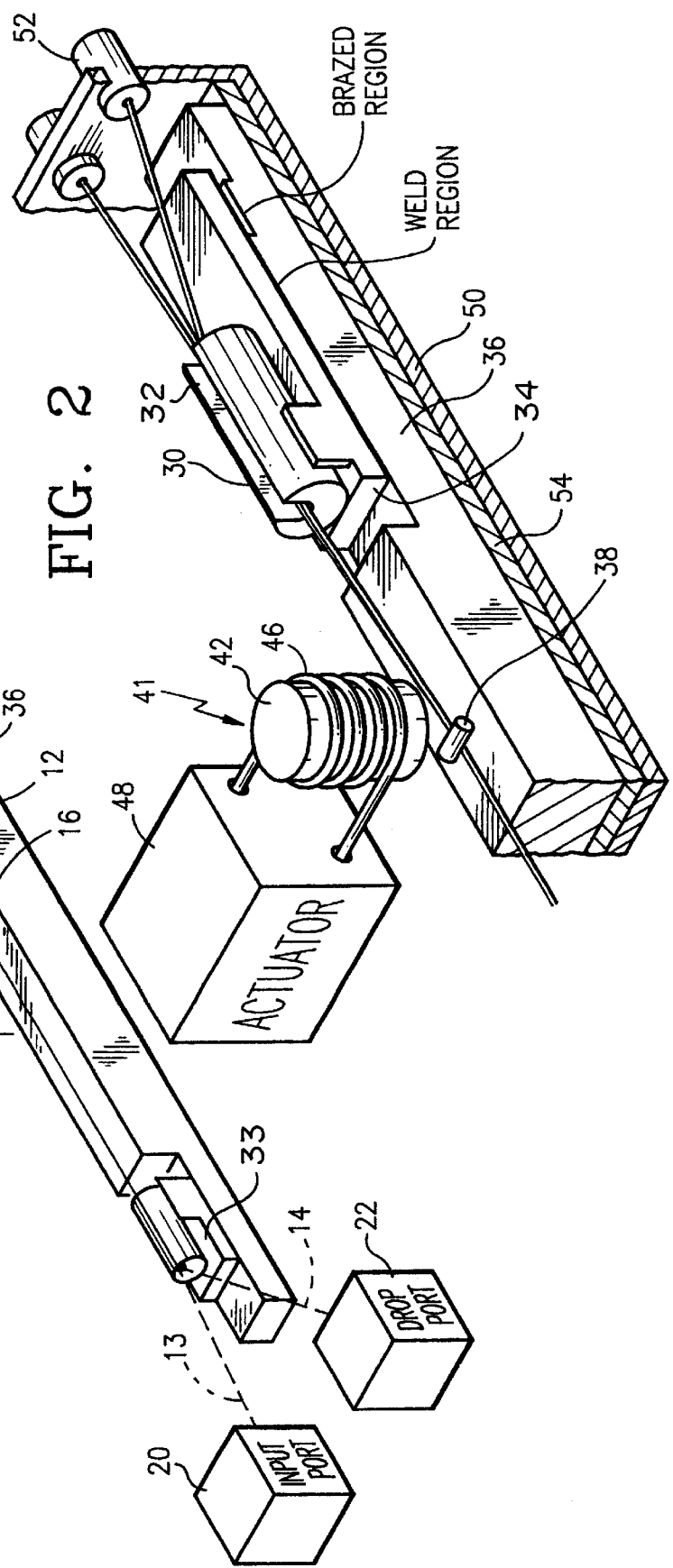
FIG. 2 is an enlarged fragmentary view of a part of the switch system of FIG. 1, showing further details of a Bragg grating device in a mounting package.

A wavelength selective optical switch 10 is shown in FIGS. 1 to 4, to which reference is now made. It utilizes a fused fiber coupler configured as a WDM add/drop filter of the type described in U.S. Pat. No. 5,805,751. Namely, a small diameter (e.g. <15 microns) waist region 12 of two fused, asymmetric optical waveguides 13, 14 extending at each end into separate adiabatically tapered diverging lengths which at their outer ends are of typical 95 to 125 micron constant diameter. A Bragg grating is written in the waist 12 of the coupler using UV exposure. The Bragg grating reflects a WDM channel supplied from an input port 20 back onto a drop port at a wavelength determined by the period of the grating 16 during fabrication and the tensioning of the waist 12. All other wavelengths are transmitted on to a through port 24 without reflection. An add port 26 on the same side as the through port 24 is available for insertion of signals at the chosen wavelength, by reflection off the grating 16 so that they reach the through port 24.

To hold the span of the waist region 12 under controlled tension between end points on a temperature compensating support, the fiber ends of the 2×2 fused fiber coupler are epoxied into a slot 32 in a slotted "Kovar" ferrule 30 using EpoTek353ND. The epoxy is initially in contact with bare glass surface of the fibers 13, 14 on the inside end of ferrule 30 and in contact with the 250 micron diameter fiber buffer material on the outside end of the ferrule 30. The ferrules 30 are attached with the fiber under tension to compensating elements 33, 34, of 304 stainless steel using laser welding. The tension applied to the waist 12 and the periodicity of the grating 16 fiber determine the center wavelength of the filter. Before attachment to the compensating elements 33, 34 the ferrules 30, with the fibers secured, are rotated a number of times (here ten) in order to minimize the polarization sensitive characteristics of the device. The compensating elements 33, 34 are attached at the outer ends of the span to a base 36 by laser welding. The length of the base 36 is 4.9" while that of the compensating elements 33, 34 is 0.75", in this example, the base 36 being of low expansion material such as "Invar 36". Temperature compensation of the center wavelength of the filter is achieved due to the thermal expansion mismatch of the materials with this configuration. As the temperature is increased the compensating elements 33, 34 expand inward faster than the base 36 expands outward. This results in the fiber-holding ferrules 30 moving toward each other giving a negative thermal expansion coefficient required for temperature compensation of the expansion of the span itself. The temperature compensation depends on the location of the welds because this determines the length of the base and the lengths of the compensating elements which can expand in opposing directions. The center wavelength of the filter depends on the tension of the waist region 12 determined by the spacing of the ferrules 30.

A small ferromagnetic metal piece 38 is attached to the top surface of the coupler span in a tapered region leading from the waist 12, using epoxy or a UV fiber recoating material such as "Desolite" from Desotech Corporation. The metal piece 38 is preferably a 2 mm section of "Kovar" wire of mass approximately 1 mg. The waist region 12 and adjoining tapers are of bare glass after stretching and writing of the Bragg grating 16. The rest of the bare glass span, back to but not including the waist region 12 may be recoated with a material such as "Desolite" to provide additional environmental protection of the glass (as indicated in FIG. 4). An adjacent electromagnet 41 comprising an electromagnet armature 42 with a silicone sheet attached on the end is placed with its pole face 43 1 mm directly above the metal piece 38. The silicone sheet 44 provides cushioning when the metal piece 36 is deflected toward the electromagnet pole face 43, thus into contact with the silicone material and not the pole face.

The coil 46 about the armature 42 has electrical leads extending outside the unit to an actuator 48 or driver circuit which, when switched on, energizes the armature 42 to create the attractive magnetic field needed for switch operation.

Figure 3:
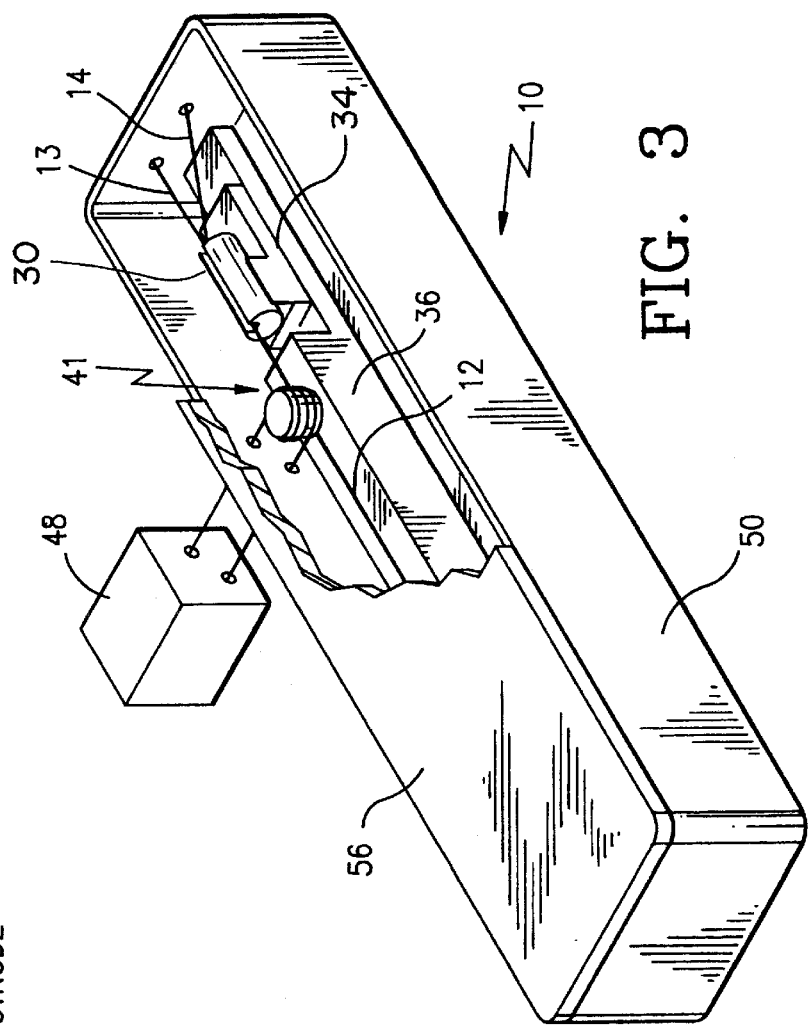
FIG. 3 is a perspective view, partially broken away, of a switch enclosed in a housing.

The coupler and electromagnet 41 are packaged inside an aluminum tray 50 (FIG. 3). Fiber feedthroughs 52 with strain relief boots are used to feed fiber through the walls of the tray 50. The, coupler and temperature compensated package are placed on a silicone mold 54 in the tray bottom and attached with RTV or other adhesive. The silicone mold 54 is shaped to receive the base 36 and provides protection from vibrational damage. After the fibers 13, 14 are fed through the feedthroughs 52 the holes are sealed with epoxy. The external electrical connections to the electromagnet 41 are connected to an electrical connector on the wall of the tray 50. The lid 56 is sealed to the tray 50 in a dry nitrogen atmosphere using epoxy to form a water tight seal.

Figure 6:
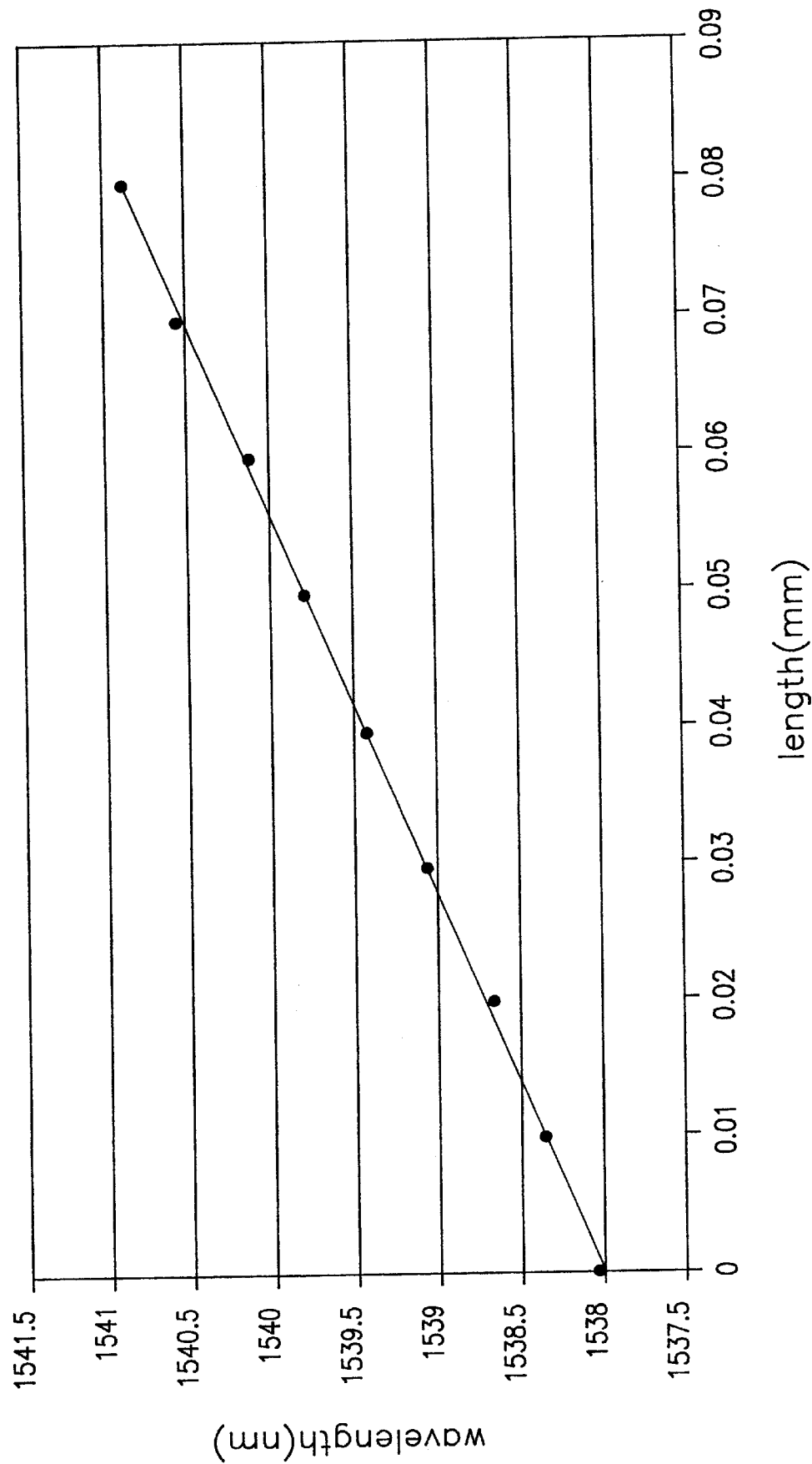
FIG. 6 is a graph of signal wavelength in nanometers versus grating length in nanometers for a Bragg grating switch in accordance with the invention.

When the coupler is stretched under tension, the wavelength of the filter changes by an amount given by:

$$\Delta\lambda/\lambda = (1-p)\Delta\epsilon \qquad \text{(eqn 1)}$$

where $\Delta\lambda$ is the change in wavelength of the filter, $\Delta\epsilon$ is the change in strain, and p is the photoelastic constant. The strain in tapered fibers is non-uniform and varies inversely with the cross sectional area. The strain therefore is mainly concentrated in the narrow tapered regions in the waist 12. FIG. 6 shows the change in the center wavelength of a filter as it is stretched. Typical tuning values are +0.036 nm/micron. Because the fibers 13, 14 are tapered to such a small waist, typically 10–15 microns, much less force is required to tune the wavelength of a coupler grating as compared to an untapered fiber Bragg grating.

Figure 5:
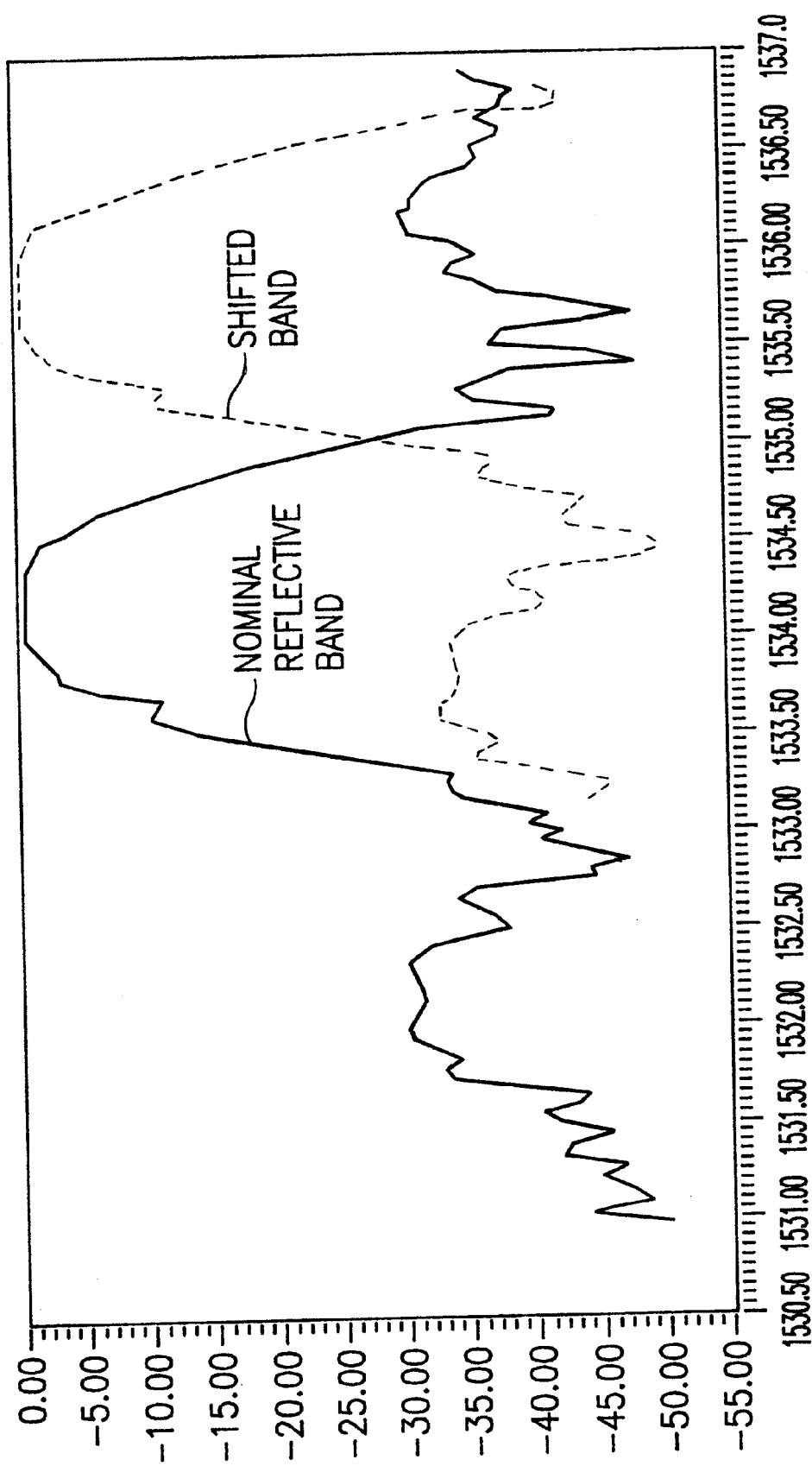
FIG. 5 is a graph of wavelength response versus signal wavelengths for a Bragg grating switch in accordance with the invention showing response variations in undeflected (solid line) and deflected (dotted line) states.

With the coupler grating filter packaged under tension to a precise wavelength, switching is effected for optical signals by applying controlled additional tension to the fiber grating 16, to change the signal band which is selected. In the relaxed state the fiber drops a selected wavelength channel, onto the drop port 22, out of multiple channels in a WDM system. When the electromagnet 41 is energized by applying a current from the actuator 48, the magnetic field attracts the metal piece 38 on the fibers 12, 13 deflecting them slightly but significantly. The deflection of the fiber results in an increase in tension, which tunes the filter to a higher wavelength, typically several nanometers, which is out of the wavelength band for the filter. The channel of selected wavelength is no longer routed back to the drop port 22 but is instead switched onto the through port 24. FIG. 5 shows the drop spectrum of the filter in the unswitched and switched states. When the electromagnet 41 is de-energized the fiber relaxes to its original state and the selected WDM channel is switched back to the drop port 22. The fiber remains in its range of elasticity during switching. Since the stretching is confined to the narrow waist region, very little force is required for the tuning.

Unlike conventional electromechanical switches the light never leaves the fiber. This results in an extremely low loss device, typically less than 0.2 dB insertion loss. Also there is no need for the complex and high mechanical tolerance single mode fiber coupling process required with conventional switches. Switching speed is limited by the time to energize the coil and to deflect the fiber. This is of the order of 10 msec. Strong gratings with over 60 dB attenuation in the transmitted state can be fabricated, to provide high channel isolation on the through fiber when the filter drops the channel. In the on state where the channel is transmitted on the through fiber, isolation on the drop fiber is determined by the roll off of the filter response and can typically be −30 dB.

Figure 7:
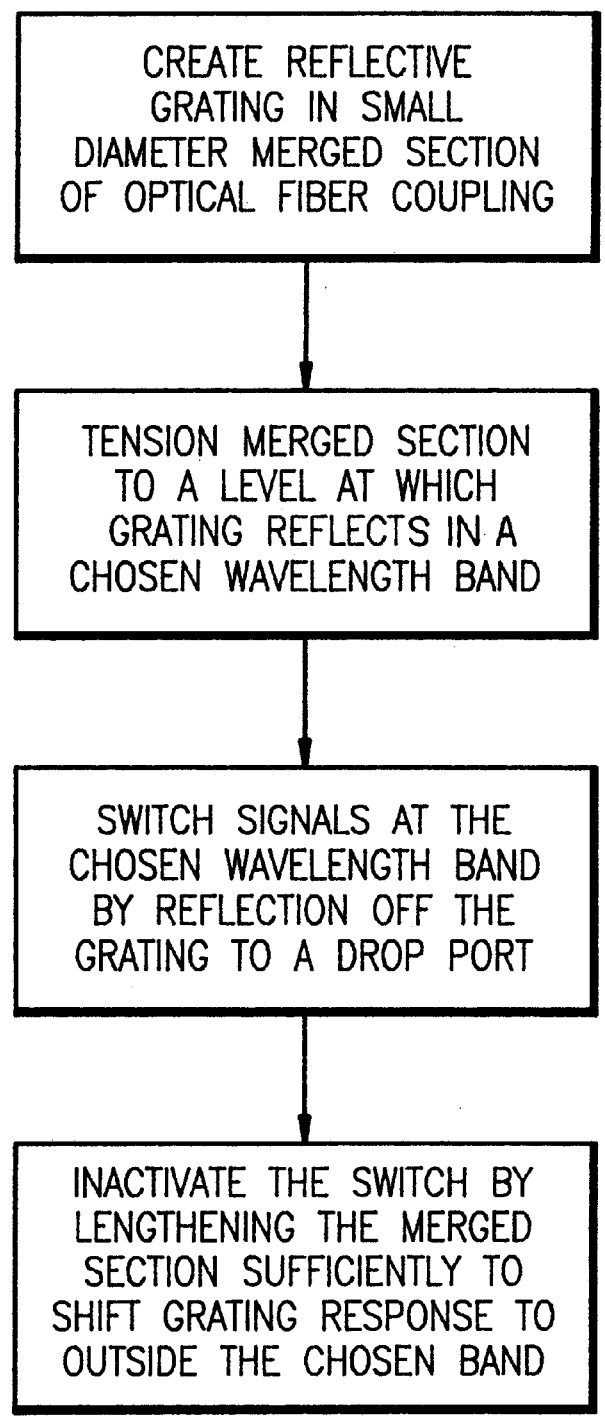
FIG. 7 is a flow diagram of the control steps used in switching optical signals in accordance with the invention.

Methods in accordance with the invention, making reference now to FIG. 7, establish a limited passband within a broader optical signal band by first creating a periodic pattern in a waveguiding element that has some elasticity that alters the periodicity. The waveguiding element is tensioned to respond to the selected optical wavelength band when it is desired to transfer optical signals at that wavelength to a given terminal. When the same optical signals are to be transferred to a different terminal the periodicity of the patterns in the waveguiding element is shifted slightly but adequately by changing the tensioning within the elastic limit of the element.

Figure 8:
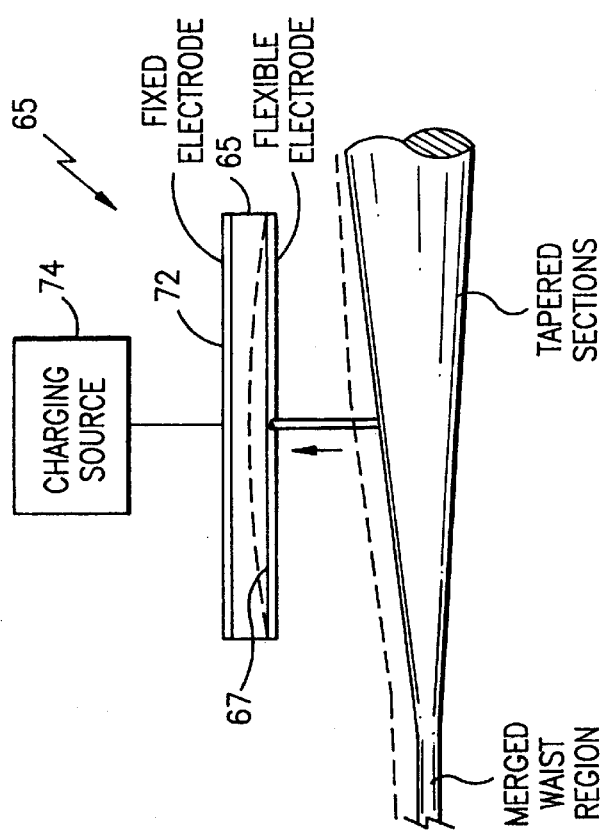
FIG. 8 is a diagram of the control mechanism portion of an alternative fiber optic switch in accordance with the invention.

As seen in the example of FIG. 8, the desired incremental shift of characteristics of a tensioned span held between two span supports with temperature compensation can also be achieved very rapidly by using an electrostatic device 65. Here a deflectable wall comprising a flexible electrode 67 of an electrostatic device 65 is coupled to the tapered section in the tensioned span of a coupler. The flexible electrode 67, when attracted by the charge on a fixed electrode 72 established by a charging source 74, moves incrementally to displace the tensioned span a given amount, which may be determined by a stop (not shown). Because the mass and tension being overcome are again very low, extremely high repetition rates are feasible.

Figure 9:
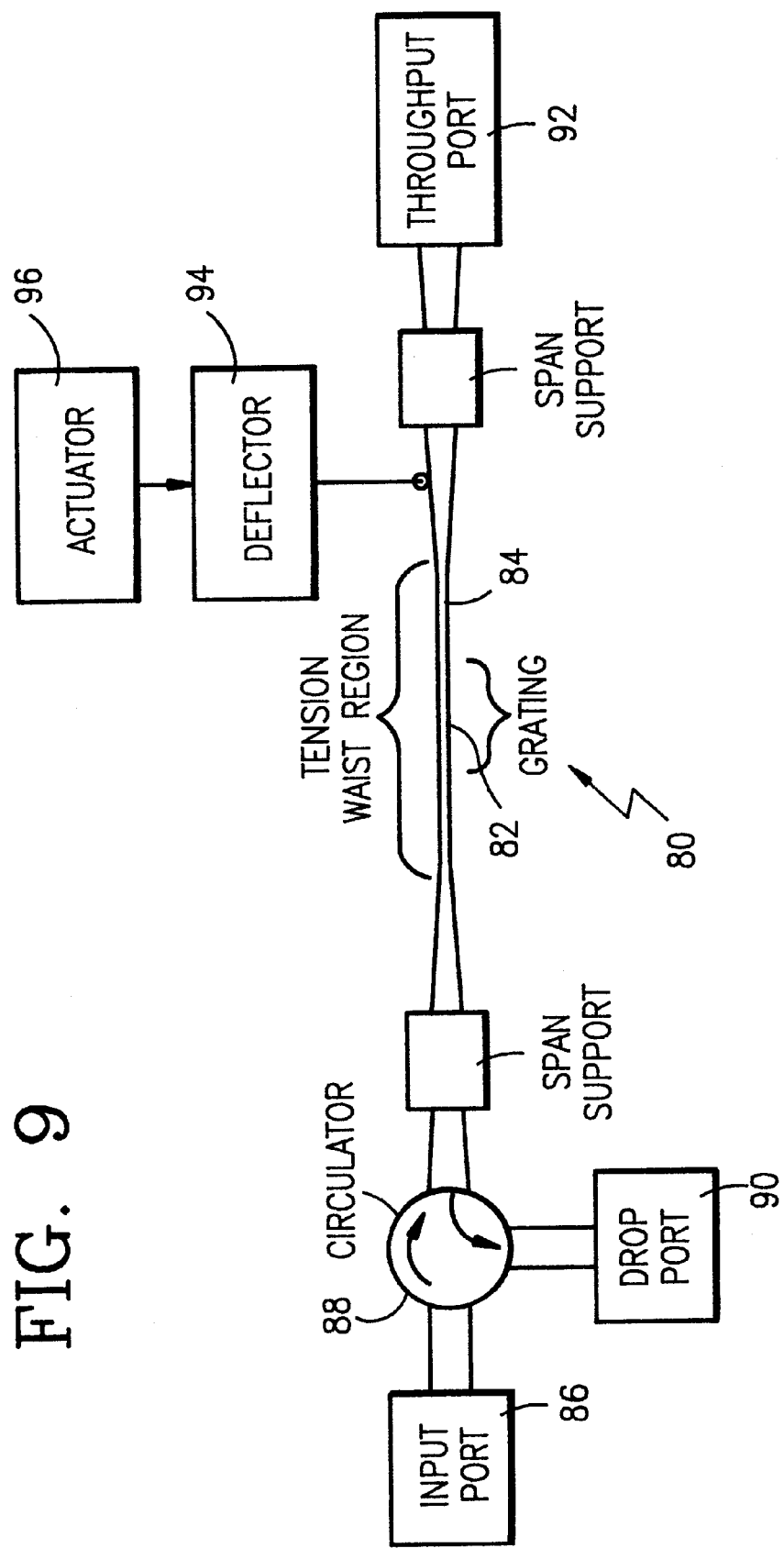
FIG. 9 is a diagrammatic view of a different type of in-fiber switching device in accordance with the invention.

As long as the optical waveguide containing a grating is sufficiently small in cross section at the grating region to be stretched for an effective distance, relative to grating periodicity, the same principle can be used. FIG. 9 depicts a single fiber device 80 including a grating 82 in a narrowed, tensioned span 84. The device 80 again is responsive only to signals in a selected passband as predetermined tension is applied. Under this condition multi-band input signals from an input port 86 are directed through a circulator 88 to the narrowed region of the span 84, where the grating 82 reflects signals of the chosen wavelength back through the circulator to a drop port 90. Other wavelengths, go through the grating region 87 to a throughput port 92. If a deflector 94 energized by an actuator 96 further tensions the span 84 and changes the grating 82 periodicity an adequate amount, however, all signals go to the throughput port 92, thus switching the chosen signals.

Although a number of alternatives and variations have been described above, the invention is not limited thereto but encompasses all forms and modifications in accordance with the appended claims.

What is claimed is:

1. A switch for selectively diverting throughput optical signals in one of a number of spaced apart predetermined wavelength bands of defined wavelength width from a throughput path to a drop path, the wavelength bands being spaced apart by preestablished separation bands, comprising:

an optical signal coupler including a multi-terminal optic device incorporating a periodic grating in a length that is extensible within elastic limits, the terminals including an input port, a throughput port and a drop port, and wherein the grating periodicity diverts a selected wavelength band from the input port to the drop port;

a temperature compensating support structure mounted to suspend at least the periodic grating length of the coupler with a tension to provide periodicity responsive to a selected wavelength band within a selected temperature range, and a deflecting device in adjacent and orthogonal spaced apart relation to the suspended length of the coupler and effective to deflect the grating length and change the tension on the grating length such that the grating periodicity shifts to be responsive to optical signals in a different separation band without affecting the temperature compensation in the selected temperature range.

2. A switch as set forth in claim 1 above, wherein the deflecting device includes a low inertia coupling to the suspended length of the coupler and operates with a time response of approximately 10 milliseconds or less.

3. A device for switching an optical signal of a selected narrow wavelength band between different ports of the device in response to a signal, comprising:

an optical signal coupler having a narrow diameter tensionable waist region and diverging tapered lengths extending therefrom at each end to terminal ports, the waist region including a periodic grating that is reflective at the selected wavelength band when the waist region is appropriately tensioned, input optical signals at one branch length then being reflected back to the other branch at the same end;

a support structure engaged to the coupler at the tapered lengths on opposite sides of the waist region and configured to maintain the waist region under a tension such that the grating periodicity reflects optical signals in the selected wavelength band and an actuable displacement device adjacent at least one of the tapered lengths and coupled thereto for physically displacing the adjacent portion of the tapered length laterally relative to the length of the waist region and stretching the waist region of the coupler to change the tension therein within the elastic limits of the waist region sufficiently to shift the reflective characteristic of the grating outside the selected wavelength band without changing the support structure such that input signals at the selected wavelength band are not reflected but are transferred through the waist region to a terminal at the opposite end.

4. A device as set forth in claim 3 above, wherein the support structure is configured to have a thermal expansion property that is substantially equal and opposite that of the coupler engaged thereon, and the displacement device comprises an electromagnetic displacer element and a selectively energizable control circuit coupled thereto.

5. A device as set forth in claim 4 above, wherein the displacement device comprises an electromagnetic armature having a pole face adjacent at least one of the tapered lengths, and a magnetic element coupled to the at least one tapered length and in facing relation to the pole face.

6. A device as set forth in claim 5 above, wherein the waist region is less than approximately 10 mm long, wherein the travel of the coupler during displacement is less than 2 mm, and wherein the device also includes a cushioning element between the pole face and the magnetic element.

7. A device as set forth in claim 3 above, wherein the coupler includes a different pair of branching diverging lengths extending from the waist region at each end thereof, the waist region comprises a pair of longitudinally merged fiber sections having a total diameter of less than 10 microns, and the device includes an input port and drop port coupled to different tapered lengths on one side of the waist region and a throughput port coupled to a tapered length on the opposite side of the waist region.

8. A device as set forth in claim 3 above, wherein the coupler waist region comprises a single fiber of less than 10 microns diameter and the device further includes an input port for supplying optical signals to be switched, a circulator coupling optical signals from the input port to the waist region, and a drop port coupled to the circulation to receive signals reflected from the waist region.

9. The method of switching an optical signal of a selected wavelength between terminals of a coupler having an input port, a coupling region including an index of refraction grating that is to reflect signals in a selected wavelength band to a drop port, and transfers other wavelengths through the coupling region to a throughput, comprising the steps of:
   tensioning the coupler with length variations with temperature such that the grating reflects signals centered on the selected wavelength band in normal operation across a selected temperature range, and
   varying the tension on the coupler within the elastic limits of the coupling region by orthogonally deflecting the tensioned coupler to shift the reflective characteristic of the grating to an adjacent noninterference wavelength band such that the selected wavelength band is coupled to the throughput port with minimal loss at the coupler without affecting the length variations with temperature.

10. A method as set forth in claim 9 above, wherein the coupling region is at least one optical fiber having a diameter of the order of 15 microns or less, and the step of varying the tension comprises deflecting the length including the grating over a selected distance.

11. A method as set forth in claim 10 above, wherein the coupler reflects signals lying within a predetermined passband and the tension variation shifts the reflective characteristic to an adjacent passband.

12. A method as set forth in claim 11 above, wherein the coupling region extends along a longitudinal axis, wherein the passband is of less than about 2 nm, and wherein the deflection is of the order of 1 mm.

13. A signal actuable switch for diverting optical input signals of a selected wavelength from an output terminal comprising:
   a suspended tensioned span of at least one optical fiber having a cross-sectional dimension of less than 10 microns and a compliance of no more than about 1 mm/mg, the span including a grating reflective in a band of less than 2 nanometers of a selected center wavelength under a chosen tension;
   a magnetic element of no greater than about 5 milligrams attached to the span, the mass thereof being accounted for in the chosen tension; and
   an electromagnet disposed adjacent the magnetic element for displacing the magnetic element and the attached span laterally by no more than about 2 mm in response to an actuating signal.

14. A switch as set forth in claim 13 above, wherein said span comprises a pair of fibers longitudinally merged along a waist length of less than 20 mm, the span further including diverging diameter tapered length extending independently from each end of the fibers in the waist length and wherein the magnetic element is attached to at least one of the diverging lengths.

15. A switch as set forth in claim 14 above, wherein the actuation time is of the order of about 10 milliseconds or less, the diverging lengths are in substantially the same plane and the electromagnet is disposed to displace the span in an orthogonal direction relative to the said plane, the tapered lengths include elastomeric protective coatings, and movement of the span changes the tension in the span by less than 2%.

16. A switch as set forth in claim 14 above, wherein the magnetic element is a Kovar wire of approximately 1 mm diameter and 1 mg mass, and wherein the element is disposed about 1 mm upon switch actuation.

* * * * *